(12) United States Patent
Tucker

(10) Patent No.: US 6,216,714 B1
(45) Date of Patent: Apr. 17, 2001

(54) GOLF CART CLUB COVER

(76) Inventor: Kelvin F. Tucker, 19787 SW. 85 th La., Dunnellon, FL (US) 34432

( * ) Notice: Subject to any disclaimer, the term of this patent is extended or adjusted under 35 U.S.C. 154(b) by 0 days.

(21) Appl. No.: 09/366,797

(22) Filed: Aug. 4, 1999

(51) Int. Cl.[7] .................................................. E04H 15/06
(52) U.S. Cl. .................. 135/88.01; 160/122; 280/DIG. 5
(58) Field of Search ................. 135/88.01, 88.1, 135/88.12, 88.13; 160/121.1, 122, 66, 67, 56; 52/74, 76; 242/530, 533.8, 9.8; 280/DIG. 5

(56) References Cited

U.S. PATENT DOCUMENTS

| | | | |
|---|---|---|---|
| 121,693 | * | 12/1871 | Vick .......................................... 52/74 |
| 1,786,048 | * | 12/1930 | Williams . | |
| 2,826,210 | * | 3/1958 | Heil . | |
| 4,088,363 | * | 5/1978 | Palmer ...................................... 135/4 |
| 4,098,536 | | 7/1978 | Mills ....................................... 296/78 |
| 4,331,169 | * | 5/1982 | Bonser ...................................... 135/5 |
| 4,830,037 | | 5/1989 | Held ........................................ 135/88 |
| 5,010,941 | | 4/1991 | Ross ....................................... 160/330 |
| 5,146,967 | | 9/1992 | Chapman .............................. 150/159 |
| 5,516,181 | * | 5/1996 | Thompson ......................... 160/121.1 |
| 5,531,239 | * | 7/1996 | Hannah, Jr. .......................... 135/88.1 |
| 5,688,018 | | 11/1997 | Simpson .............................. 296/138 |
| 6,068,008 | * | 5/2000 | Caldwell ................................ 165/99 |

\* cited by examiner

*Primary Examiner*—Daniel P. Stodola
*Assistant Examiner*—Curtis A. Cohen

(57) ABSTRACT

The Golf Cart Club Cover mounted on the rear of a golf cart protects a golfers bag and clubs from the rain. Rotating it open for protection creates energy to automatically rewind and store it adjacent to the rear roof edge.

1 Claim, 3 Drawing Sheets

PRIOR ART

GOLF CART CLUB COVER

FIELD OF INVENTION

This invention protects the golf bags and clubs located on the rear of a golf cart from getting wet. If a golfer plays during the rain, the cover affords easy access and replacement with minimal rain intrusion on the other clubs.

DESCRIPTION OF PRIOR ART

Golf carts, after manufacture, are generally outfitted with a roof and windshield affording some personal protection for the golfer. Golf bags and clubs on the rear of the golf cart are uncovered and exposed to the rain. Golf bags and clubs getting wet is undesirable from a usability and deterioration standpoint. To protect the bags and clubs, many alternatives have been developed.

The most common alternative is the canvas cover that protects the whole cart and club area. They afford maximum protection, but are bulky, difficult to use, unsightly, subject to cracking, wear, mildew, and block the golfers field of vision. There are also lighter weight all vinyl versions available, per Mills U.S. Pat. No. 4,098,536 (1978). Their only redeeming feature is good visibility. In general, the whole cart cover approach is awkward to use when occasionally needed and a real nuisance the rest of the time.

The second set of alternatives for protecting golf bags and clubs on golf carts are separate vinyl or canvas envelopes or hoods as per Chapman U.S. Pat. No. 5,146,967 (1992). They encase one or two bags and have some sort of a club access panel. They afford reasonable protection but are bulky to store, prone to cracking, mildew, and unsightly. Inverted garbage bags work almost as well and are considerably cheaper.

The third set of alternatives is a manual roll down flap attached to the rear of the golf cart roof. They are held down with elastic cords hooked either to the bumper or the bag straps. An obvious disadvantage of this approach is the manual roll-up. Other disadvantages are incumbent with the type of material used: black plastic as per Ross U.S. Pat. No. 5,010,941 (1991) blocks the view and looks unsightly; clear vinyl as per Simpson U.S. Pat. No. 5,688,018 (1997) needs rerolling and thoroughly drying to avoid fogging and mildew.

The fourth set of alternatives is a fold down canopy cover over the bags and clubs. Held U.S. Pat. No. 4,830,037 (1989) proposes a manual canopy. This works but is unsightly, blocks vision, and is subject to mildew.

My approach is a canopy that locks down when open and automatically rewinds into a neat package when not in use. Utilizing clear vinyl allows full rearward vision. Maintenance is also eased Iy the simple pull-down and automatic roll-up.

OBJECTS AND ADVANTAGES

Objects of this invention are; 1) keep a golfer's clubs dry, 2) provide easy access to the clubs, for use in the rain, and 3) be neat and out of the way when not in use. Advantages are ease of use, neat, good rearward vision, long material life due to rolling rather than folding or bundling, and easy maintenance.

Figure 1A:
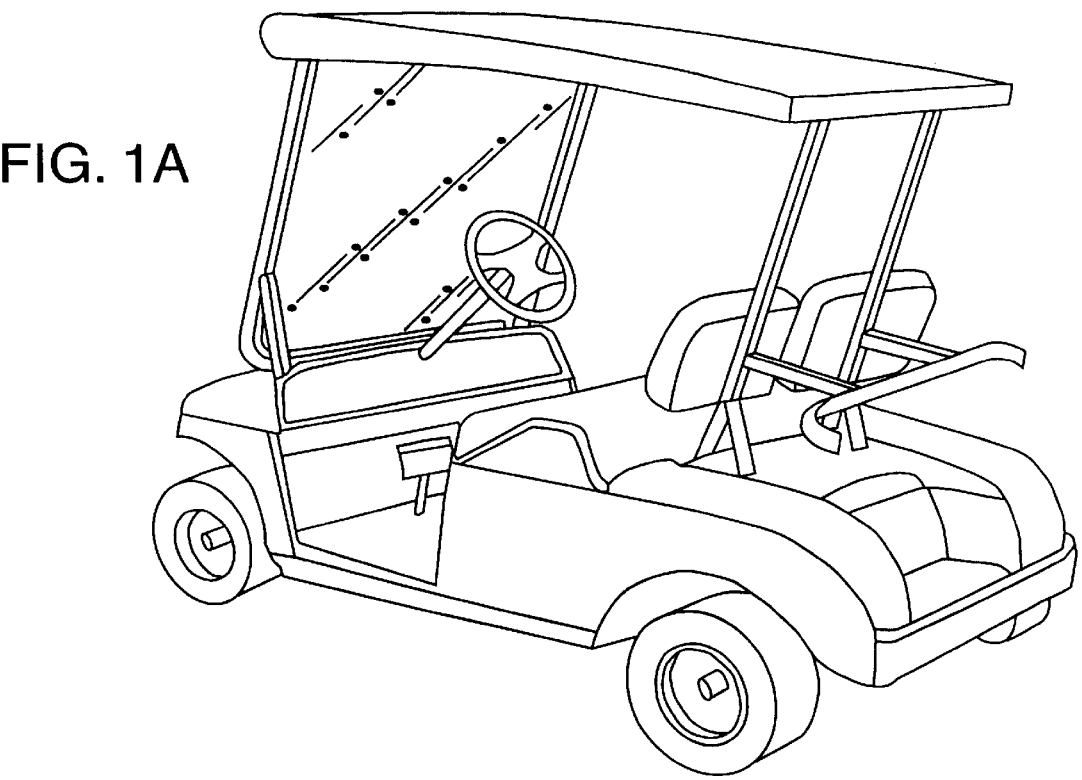
FIG. 1A Typical golf cart with the aftermarket roof and windshield installed.
Figure 2A:
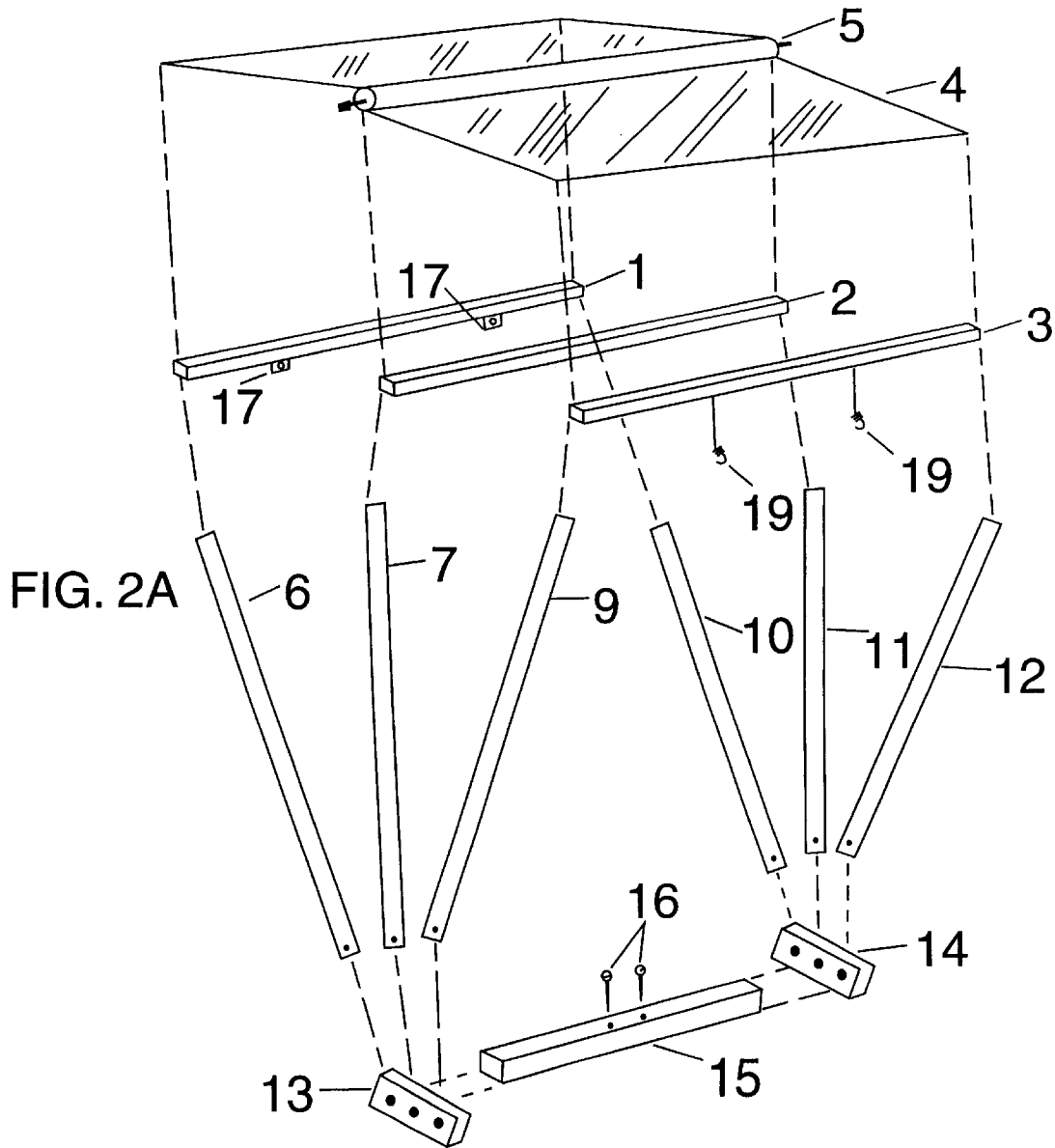
FIG. 2A Is an exploded view of the Golf Cart Club Cover.
Figure 3A:
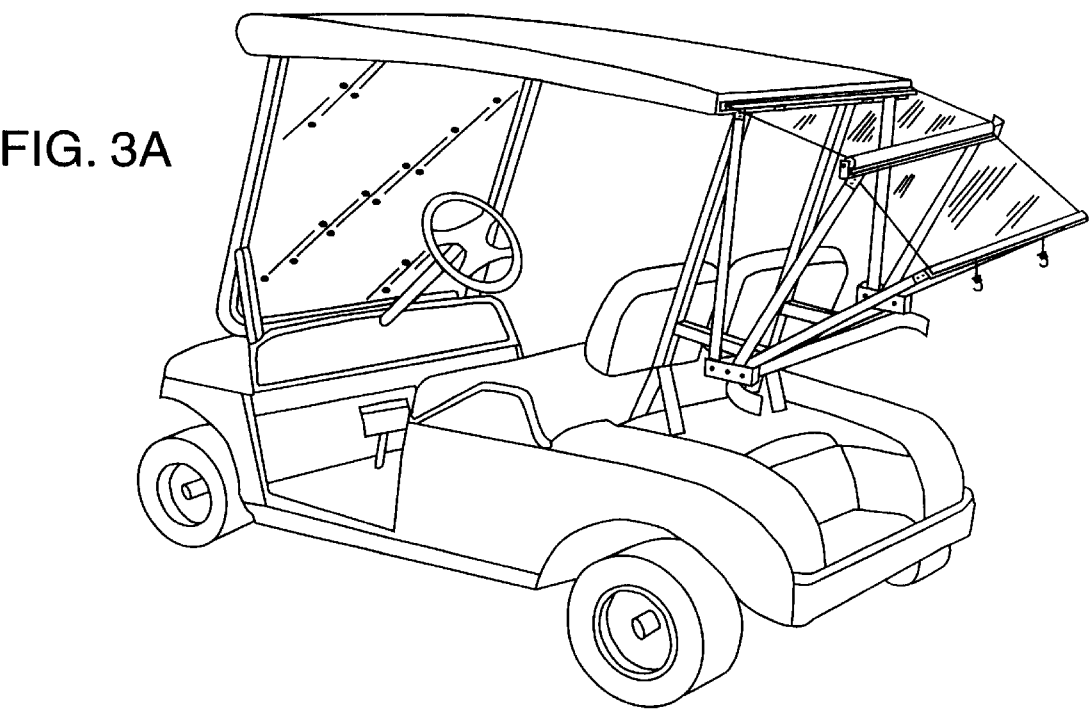
FIG. 3A Is the Golf Cart Club Cover attached to the rear of the golf cart in a 50% open position.

Reference Numerals in Drawings
1) Stationary Cross Bar
2) Roller Cross Bar
3) Leading Cross Bar
4) Vinyl Cover
5) Take-up Roller
6) Stationary Arm - Left
7) Roller Arm - Left
9) Leading Arm - Left
10) Stationary Arm - Right
11) Roller Arm - Right
12) Leading Arm - Right
13) Pivot Bracket - Left
14) Pivot Bracket - Right
15) Support Bar
16) Support Bar Attachment Bolts
17) Upper Attachment Brackets
19) Holddown Cords

SUMMARY OF INVENTION

Applicant's Golf Cart Club Cover is a rain canopy that protects the golf bags and clubs on the rear of a golf cart. After use the canopy automatically rewinds to a vertical position adjacent to the rear of the golf cart roof. The canopy is designed as a semi-permanent attachment to the rear of a golf cart.

DESCRIPTION OF INVENTION

Applicants invention is a rain canopy that attaches by four bolts to the rear of a golf cart. To protect the golf clubs the canopy, Leading Cross Bar #3, is pulled rearward, rotating 90 degrees from a vertical to a horizontal position. Holddown cords keep it in that position. During the opening rotation process, other frame members move in a similar but smaller arc. Also during opening, Vinyl Cover #4 is withdrawn from Take-up Roller #5 in opposite directions thereby winding the take-up spring in Take-up Roller #5. When the canopy is no longer needed, unhook the Holddown Cords #19, and the canopy automatically rewinds to a vertical position.

The Golf Cart Club Cover utilizes an old technology; the window shade roller. Take-up Roller #5 is a window shade roller with two layers of vinyl concentrically unwinding during opening and closing. Utilizing this technology produces a novel canopy action that facilitates use, durability and maintenance.

Applicants cover provides a durable, weatherproof canopy with good visibility, low maintenance and pleasing appearance.

The cover is manufactured as a unit to install on a golf cart. Support Bar 15 is attached by two Support Bar Attachment Bolts 16 to the horizontal bars that hold the top of the golf bags. Pivot Brackets 13 and 14 are riveted to each end of Support Bar 15. Three left arms; 6, 7 and 9, and three right arms; 10, 11 and 12, are bolted (bolts not shown) to their respective pivot brackets. Stationary Cross Bar 1 is attached across the top of Stationary Arm 6 and Stationary Arm 10 by angle backets and rivets (angle brackets and rivets not shown). Similarily, Roller Cross Bar 2 is attached across Roller Arms 7 and 11. The Leading Cross Bar 3 is attached in the same manner across Leading Arms 9 and 12.

There are two Holddown Cords 19 on the Leading Cross Bar 3. They are attached by holes and knots.

The Vinyl Cover 4, 2 pieces about 40" wide and 20" long, are taped to Take-Up Roller 5. The width dimension is attached to the Take-Up Roller 5. The opposing width ends of the vinyl are attached to the Stationary Cross Bar 1 and the Leading Cross Bar 3. The cross bars are two piece U shaped PVC bars that nest together clamping the vinyl in the middle. The bars are riveted together holding the vinyl.

The Take-Up Roller 5 is riveted to the top of the Roller Cross Bar 2 by an angle bracket with an oblong hole on the left end and an angle bracket with a round hole on the right end (brackets not shown). The right bracket serves as an axle frame for the pin on the right end of Take-Up Roller 5. The left bracket holds the left end of the Take-Up Roller 5 and also is the post for winding spring.

Take-Up Roller 5 has not been diagramed because it will be purchased as a unit (without vinyl) from a window shade manufacturer. The only differences from a normal window shade core are;

1) take-up spring, down the core center, will be stronger to accomodate winding two layers of heavy vinyl,
2) the pull down catch feature will be eliminated.

Operation

The cover is installed on the golf cart with four bolts. To use the cover; pull the Leading Cross Bar 3 rearward and down thru a 90 degree rotation and fasten Holddown Cord 19 to the golf bag straps. The pull down winds the spring in Take-Up Roller 5. Unhooking the Holddown Cords 19 and the unit will automatically return to a vertical position at the rear edge of the golf cart roof.

Occasional cleaning of Vinyl 4 will maintain the units good appearance. No other maintenance is required.

Conclusion

Utilizing the window shade roll-up concept, the Golf Cart Club Cover is a novel use of an established technology. The cover is easy to use, neat, functional, long lasting and virtually maintenance free. It also does not interfere with rearward vision whether up or down.

Prior art alternatives are clumsy, difficult to use, subject to mildew and cracking and are untidy. My approach solves these problems by a relatively simple concept. The need for my cover is apparent from the proliferation of other devices, none of which has had more than marginal market success.

The preferred embodiment for my cover is polyvinylchloride for the arms, cross bars, pivot brackets, and support bar. Aluminum, steel or other plastic compounds could be used for these components.

The Vinyl 4 top is preferred roll vinyl but could be another clear flexible plastic material.

The Take-Up Roller 5 will be vinyl coated to resist moisture infiltration. Aluminum, steel or other plastic could be used for the roller.

In conclusion, my cover satisfies a long felt need for an easy to use, unobtrusive way to protect a golfer's equipment from the effects of rain.

What is claimed is:

1. A golf cart club cover composed of a rectangular, double layered vinyl sheet;

said vinyl sheet being wound on a curtain rod roller;

a roller crossbar is attached to said roller, a front crossbar is attached to a front edge of said vinyl sheet, and a rear cross bar is attached to the rear edge of said vinyl sheet;

said front crossbar is attachable to the rear of a golf cart roof;

said roller crossbar and said rear crossbar are horizontally suspended on their respective ends across axially rotating support arms;

said support arms rotate from separate axle housings;

said axle housings are affixed to the left and right ends of an attachment bar;

said attachment bar is affixed to a golf cart bag frame at the rotational center of the golf cart club cover;

when said cover is deployed, said cover is rotated 90 degrees rearward and downward to form a shelter for golf clubs.

\* \* \* \* \*